(12) United States Patent
Aoki et al.

(10) Patent No.: US 7,134,127 B2
(45) Date of Patent: Nov. 7, 2006

(54) DISK PLAYER

(75) Inventors: Shinichi Aoki, Tottori (JP); Yoshikazu Hasegawa, Tottori (JP); Yukinori Hokimoto, Tottori (JP)

(73) Assignees: Sanyo Electric Co., Ltd., Osaka (JP); Tottori Sanyo Electric Co., Ltd., Tottori (JP)

( * ) Notice: Subject to any disclaimer, the term of this patent is extended or adjusted under 35 U.S.C. 154(b) by 0 days.

(21) Appl. No.: 10/536,438

(22) PCT Filed: Aug. 6, 2003

(86) PCT No.: PCT/JP03/10037

§ 371 (c)(1),
(2), (4) Date: May 26, 2005

(87) PCT Pub. No.: WO2004/049324

PCT Pub. Date: Jun. 10, 2004

(65) Prior Publication Data

US 2005/0289562 A1 Dec. 29, 2005

(30) Foreign Application Priority Data

Nov. 28, 2002 (JP) .............................. 2002-345126
Nov. 28, 2002 (JP) .............................. 2002-345127
Nov. 28, 2002 (JP) .............................. 2002-345128

(51) Int. Cl.
*G11B 17/04* (2006.01)

(52) U.S. Cl. .................................... 720/619

(58) Field of Classification Search ............... 369/77.1; 720/620, 621, 622, 623
See application file for complete search history.

(56) References Cited

FOREIGN PATENT DOCUMENTS

| JP | 8-111054 | 4/1996 |
|---|---|---|
| JP | 10-3722 | 1/1998 |
| JP | 10-340513 | 12/1998 |
| JP | 2000-339877 | 12/2000 |
| JP | 2001-143352 | 5/2001 |
| JP | 2002-100131 | 4/2002 |
| JP | 2002-140849 | 5/2002 |
| JP | 2002-230878 | 8/2002 |
| JP | 2002-288907 | 10/2002 |
| JP | 2002-288911 | 10/2002 |
| JP | 2002-298519 | 10/2002 |

*Primary Examiner*—Hoa T. Nguyen
*Assistant Examiner*—Mark Blouin
(74) *Attorney, Agent, or Firm*—Westerman, Hattori, Daniels & Adrian, LLP.

(57) ABSTRACT

A restriction plate (21) is provided on a lower surface of a near side of an upper plate of a chassis base (101). Both disk (D1) and disk (D2), while keeping in contact with a contact guide portion P1 of the restriction plate (21), are inserted. A stopper portion (P2) is formed at a farther side position than the contact guide portion (P1). A peripheral surface of a transfer roller (5) is placed in a moving direction of the disks (D1), (D2) proceeding while contacting upper surfaces of disk guides (2R), (2L) of a disk loading slit (20), and the contact guide portion (P1). Further, the stopper portion (P2) exists at a position corresponding to a direction of a tangent line which passes through the contact guide portion (P1), out of the tangent lines of the aforementioned peripheral surface, at positions other than the moving direction of the disks (D1), (D2).

17 Claims, 12 Drawing Sheets

(a)

(a)

(b)

(a)

(b)

(a)

(b)

DISK PLAYER

TECHNICAL FIELD

The present invention relates to a disk player for reproducing a disk (recording medium) such as a CD or a DVD, and others.

BACKGROUND ART

Conventionally, portable-type disk players and vehicle-mounted type disk players have been proposed. In recent years, there have been proposed disk players capable of reproducing both an 8-cm disk and a 12-cm disk (see JP-A 2001-143352). Further, there have been proposed disk players capable of reproducing a DVD, as well as a CD.

In such the disk players, there is a need for a mechanism to prevent foreign substances such as a telephone card, and others, from being inserted into a player main body.

Further, in such the disk players, during ejecting, an operation for raising a clamper for clamping the disk is performed, and in a case that the clamper is positioned by abutting a tip-end side (a portion raised most highly) of the clamper against a chassis upper plate, the clamper, if a force of the abutment is large, may be caused to be bent.

Further, in such the disk players, it is desired that a transition to an ejecting state is made after an optical pickup can be surely placed at an information recording area on an innermost area of the disk. Further, specifically, in reproducing the DVD, it is required that the optical pickup be made to be moved accurately in parallel with a disk surface.

Further, in such the disk players, the optical pickup, while fixed in other states, is movable when a disk is reproduced. Incidentally, a driving power of a motor is switched between for moving the optical pickup and for clamping the disk. It is required that a timing of switching the driving power from for clamping the disk to for moving the optical pickup occur concurrently with a timing of releasing a state that the optical pickup is fixed and it is desired to be formed of a simple mechanism.

Further, in such the disk players, in consideration of use at locations where impacts or vibrations can occur, particularly in cases of the vehicle-mounted type disk players, it is required to bring these disk players into an elastically-supported state in order to prevent impacts, etc., from being transferred to the reproducing portion. Further, when a disk is being transferred into the disk player, it is required to prevent the disk from abutting against a transfer roller due to the impacts, etc. The mechanism is required to include a small number of components and be simple, in order to make the disk player compact and save a cost.

DISCLOSURE OF THE INVENTION

In order to overcome the aforementioned problems, a disk player according to the present invention comprises a contact guide portion which comes into contact with a disk inserted from a disk loading port, a stopper portion which is placed on a farther side than the contact guide portion, a transfer roller that is provided between the contact guide portion and the stopper portion and transfers the disk, a transfer mechanism for transmitting a driving power of a motor to the transfer roller, a clamper for clamping the disk transferred thereto, a clamp mechanism for causing the clamper to lift or descend, an optical pickup base which is guided in a linear manner in a radial direction of the disk clamped by the clamper, and a pickup moving mechanism for moving the pickup base in the radial direction of the disk. A peripheral surface of the transfer roller is placed in a moving direction of the disk proceeding while keeping in contact with the disk loading port and the contact guide portion, the transfer roller is provided in such a manner as to move a little by being pushed by the disk, the disk proceeds without contacting the stopper portion, and on the other hand, a member to be bent easier than the disk is not capable of moving the transfer roller, the member proceeds toward the stopper portion and contacts the stopper portion, thus transferring is prevented (hereinafter, referred to as a first configuration in this section).

With the aforementioned configuration, the disk proceeds while keeping in contact with the contact guide portion and the disk loading port and, in the middle of an insertion, the disk contacts the peripheral surface of the transfer roller, and is transferred by the transfer roller. At a time of this transfer, the roller moves to some degree by being pushed by the disk. In addition, since the stopper portion does not exist in the moving direction of the disk, the transfer of the disk will not be obstructed. On the other hand, even if an attempt is made to insert a telephone card into the disk loading port out of mischief, the insertion of this card is prevented. Cards are formed to be relatively thin and thus are soft and easily bent compared with the disk. Therefore, the inserted card is not capable of moving the transfer roller. Since the transfer roller is not moved, the card will proceed toward the stopper portion and contacts the stopper portion, which will stop the transfer.

In the first configuration, preferably, the disk player is configured to be adaptable to both a first disk having a large diameter and a second disk having a small diameter, and the disk loading port includes disk transfer receiving portions on both sides, the second disk is configured in such a manner as to lose contact with the disk transfer receiving portions at an earlier stage of insertion than the first disk, and a transfer stopper for the second disk is provided at a position which comes into contact with only the second disk. According thereto, from a time that the second disk loses contact with the disk transfer receiving portions, the moving direction changes, and this enables to make a difference between the moving directions of the first disk and the second disk.

In the first configuration, preferably, the disk player is adaptable to both a first disk having a large diameter and a second disk having a small diameter, and comprises a moving member having a first contact portion which contacts a tip end of the first disk having a larger diameter transferred thereto by the transfer roller and a second contact portion which contacts the tip end of the first disk having a small diameter transferred thereto by the transfer roller, and is configured that a movement of the moving member caused by the contact between the disks and the contact portions causes a switching of a supplying destination of the driving power of the motor from the transfer mechanism to the clamp mechanism.

In the first configuration, preferably, the disk player is configured such that a reproducing portion is formed by being provided with the clamper, the clamp mechanism, the transfer mechanism, the optical pickup base, the pickup moving mechanism, and a roller supporting mechanism for movably supporting the transfer roller in the same cabinet, and is configured to be adaptable to both a first disk having a large diameter and a second disk having a small diameter, comprises a lock mechanism for fixedly or elastically supporting the reproducing portion, a slider which engages with the lock mechanism and the roller supporting mechanism, and a moving member including a first contact portion which contacts a tip end of the first disk having a larger diameter transferred thereto by the transfer roller and a second contact portion which contacts the tip end of the first disk having a small diameter transferred thereto by the transfer roller, and configured such that a movement of the moving member caused as a result of the disk contacting the contact portion causes the slider to move, and this movement of the slider causes the roller supporting mechanism to move, thereby pulling the transfer roller away from the disk, and causes the lock mechanism to move, thereby changing the reproducing portion from a fixed state to an elastically-supported state.

In the first configuration, preferably, the disk player comprises a switching mechanism for switching the supplying destination of the driving power of the motor either to the clamp mechanism or to the pickup moving mechanism. The switching mechanism is configured in such a manner as to restrict a movement of the pickup moving mechanism when applying the driving power of the motor to the clamp mechanism, and allow the movement of the pickup moving mechanism when applying the driving power of the motor to the pickup moving mechanism.

In the first configuration, preferably, the clamper is provided in such a manner as to be lifted or descended by the clamp mechanism with a rear-end portion thereof serving as a supporting point, and the rear-end portion is configured in such a manner as to engage with engaging holes which allow upward and downward movements of the rear-end portion. According thereto, when the clamper is further pushed upwardly after being lifted and abuts against an upper plate of a chassis, the rear-end portion can move (run off) upwardly in the engaging holes, which can prevent bending of the clamper.

In the first configuration, preferably, the disk player comprises a coupling mechanism for coupling the pickup base and the pickup moving mechanism. The coupling mechanism is configured in such a manner as to allow a movement of the pickup moving mechanism even after the pickup base is guided to a guide end near a center of the disk, and in such a manner that this movement causes a switching of the supplying destination of the driving power of the motor from the pickup moving mechanism to the clamp mechanism.

In the first configuration, preferably, there is provided an adjusting mechanism for adjusting an attitude of the optical pickup base and the coupling mechanism is configured in such a manner as to allow a change of the attitude of the optical pickup base without changing the attitude of the pickup moving mechanism.

In the first configuration, preferably, the disk player is configured in such a manner as to fix the pickup moving mechanism when the supplying destination of the driving power of the motor is switched from the pickup moving mechanism to the clamp mechanism.

Further, a disk player according to the present invention comprises a disk loading port, a transfer roller that transfers a disk, a roller supporting mechanism for movably supporting the transfer roller, a transfer mechanism for transmitting a driving power of a motor to the transfer roller, a clamper for clamping the disk transferred thereto, a clamp mechanism for causing the clamper to lift or descend, an optical pickup base which is guided in a linear manner in a radial direction of the disk clamped by the clamper, a pickup moving mechanism for moving the pickup base in the radial direction of the disk, and a coupling mechanism for coupling the pickup base and the pickup moving mechanism. The coupling mechanism is configured in such a manner as to allow a movement of the pickup moving mechanism even after the pickup base has been guided to a guide end near a center of the disk, and in such a manner that this movement causes a switching of the supplying destination of the driving power of the motor from the pickup moving mechanism to the clamp mechanism (hereinafter, referred to as a second configuration, in this section).

With the above-described configuration, a trigger operation for transition to an ejecting state can be performed after the optical pickup is surely placed at an information recording area on an innermost area of the disk.

In the second configuration, preferably, the disk player is configured in such a manner as to be adaptable to both a first disk having a large diameter and a second disk having a small diameter. The disk loading port includes disk transfer receiving portions on both sides, the second disk is configured in such a manner as to lose contact with the disk transfer receiving portions at an earlier stage of insertion than the first disk, and a transfer stopper for the second disk is provided at a position which comes into contact with only the second disk.

In the second configuration, preferably, the disk player is configured to be adaptable to both a first disk having a large diameter and a second disk having a small diameter and comprises a moving member having a first contact portion which contacts a tip end of the first disk having a larger diameter transferred thereto by the transfer roller and a second contact portion which contacts a tip end of the first disk having a small diameter transferred thereto by the transfer roller. A movement of the moving member, as a result of the disk contacting the contact portions, causes a switching of the supplying destination of the driving power of the motor from the transfer mechanism to the clamp mechanism.

In the second configuration, preferably, the disk player is configured such that a reproducing portion is formed by being provided with the clamper, the clamp mechanism, the transfer mechanism, the optical pickup base, the pickup moving mechanism, and the roller supporting mechanism in the same cabinet, and configured to be adaptable to both a first disk having a large diameter and a second disk having a small diameter, comprises a lock mechanism for fixedly or elastically supporting the reproducing portion, a slider which engages with the lock mechanism and the roller supporting mechanism, and a moving member including a first contact portion which contacts a tip end of the first disk having a larger diameter transferred thereto by the transfer roller and a second contact portion which contacts a tip end of the first disk having a small diameter transferred thereto by the transfer roller, and configured such that the movement of the moving member caused as a result of the disk contacting the contact portion causes the slider to move, and this movement of the slider causes the roller supporting mechanism to move, thereby pulling the transfer roller away from the disk, and causes the lock mechanism to move, thereby changing the reproducing portion from a fixed state to an elastically-supported state.

In the second configuration, preferably, the disk player comprises a switching mechanism for switching the supplying destination of the driving power of the motor either to the clamp mechanism or to the pickup moving mechanism. The switching mechanism is configured in such a manner as to restrict a movement of the pickup moving mechanism when applying the driving power of the motor to the clamp mechanism and allow the movement of the pickup moving mechanism when applying the driving power of the motor to the pickup moving mechanism.

In the second configuration, preferably, the clamper is provided in such a manner as to be lifted or descended by the clamp mechanism with a rear-end portion thereof serving as a supporting point, and the rear-end portion is configured in such a manner as to engage with engaging holes which allow upward and downward movements of the rear-end portion.

In the second configuration, preferably, there is provided an adjusting mechanism for adjusting an attitude of an optical pickup base and the coupling mechanism is configured in such a manner as to allow a change of the attitude of the optical pickup base without changing the attitude of the pickup moving mechanism.

In the second configuration, preferably, the disk player is configured in such a manner as to fix the pickup moving mechanism when the supplying destination of the driving power of the motor is switched from the pickup moving mechanism to the clamp mechanism.

BRIEF DESCRIPTION OF THE DRAWINGS

FIG. 1(a) is a plan view;

FIG. 1(b) is a front view;

FIG. 1(c) is a right side view;

FIG. 3(a) is a plan view;

FIG. 3(b) is a left side view;

FIG. 3(c) is a right side view;

FIG. 3(c) is a descriptive diagram of the right side surface;

FIG. 9(b) is a descriptive diagram illustrating a preventing state when a telephone card is inserted;

FIG. 12(a) is a view illustrating an embodiment of the present invention;

FIG. 12(b) is a reference view for comparison; and

BEST MODE FOR PRACTICING THE INVENTION

Hereinafter, an embodiment of the present invention will be described based on FIGS. 1 to 13.

(General Outline of Disk Player)

Figure 1:
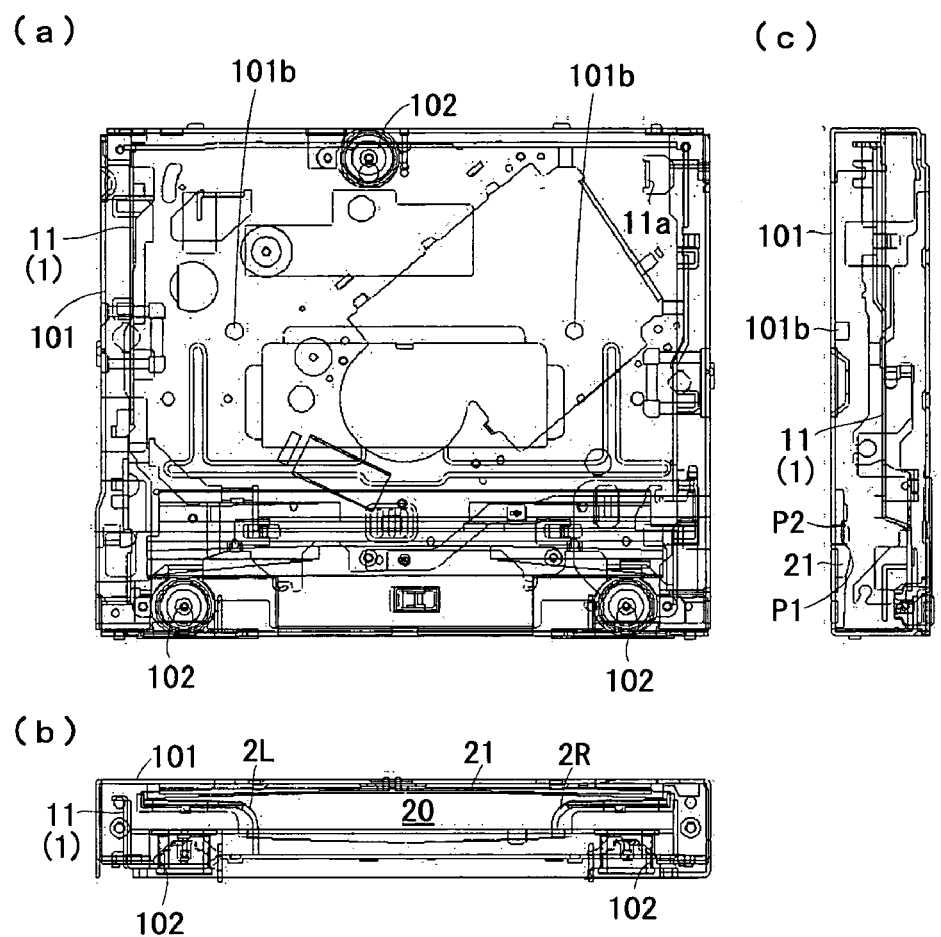
FIG. 1 is a view illustrating a disk player according to an embodiment of the present invention (a driving mechanism is omitted)

FIG. 1 illustrates a disk player (chassis portion), wherein representation of various types of driving mechanisms is omitted. FIG. 1(a) is a plan view, FIG. 1(b) is a front view and FIG. 1(c) is a right side view. A disk player main body 1 (a main body chassis 11 is illustrated in FIG. 1) is provided within a chassis base 1101. The main body chassis 11 is elastically supported by coil spring clampers 102 (which are placed at three positions) provided on a lower-surface side of the main-body chassis 11, within the chassis base 101. A disk loading slit 20 is formed in a front surface of the chassis base 101. The disk loading slit 20 is provided with a right disk guide 2R and a left disk guide 2L formed from resin, and the disk loading slit 20 has a shape similar to a T-shape. The distance between the right end of the upper surface of the right disk guide 2R and the left end of the upper surface of the left disk guide 2L corresponds to a 12-cm disk. The distance between the inner wall surface of the right disk guide 2R and the inner wall surface of the left disk guide 2L is made slightly smaller than the diameter of an 8-cm disk.

There are differences between an operation at a time of inserting a 12-cm disk and an operation at a time of inserting an 8-cm disk. This will be described later.

Herein, this disk player has a disk-rotatable state (playing state), a disk-loading/unloading state (ejecting state), and a transition state between the ejecting state and the playing state. Hereinafter, general outlines regarding a disk transfer in the respective states will be described based on FIGS. 2 and 3, and general outlines regarding a transfer of a driving power of a motor 12 in the respective states will be described based on FIGS. 3 to 8.

(1) Playing State (Relating to Transfer of Disk)

As illustrated in FIG. 2(a), a clamper 3 is in a descending state and thus a disk not shown is brought into a clamped state. The clamper 3 swings with supporting point portions 3a, 3a formed at a rear side thereof serving as the supporting points, thus forming a lifting state and a descending state. A flange portion 3b of the clamper 3 has a disk-shape and is rotatably provided. At a position facing the flange portion 3b, a disk receiving portion 4 is placed. The disk receiving portion 4 is rotated by a motor not shown. A disk loaded in the disk player main body 1 is clamped at its center by the flange portion 3b and the disk receiving portion 4 and is rotated by a rotation of the disk receiving portion 4.

Figure 3:
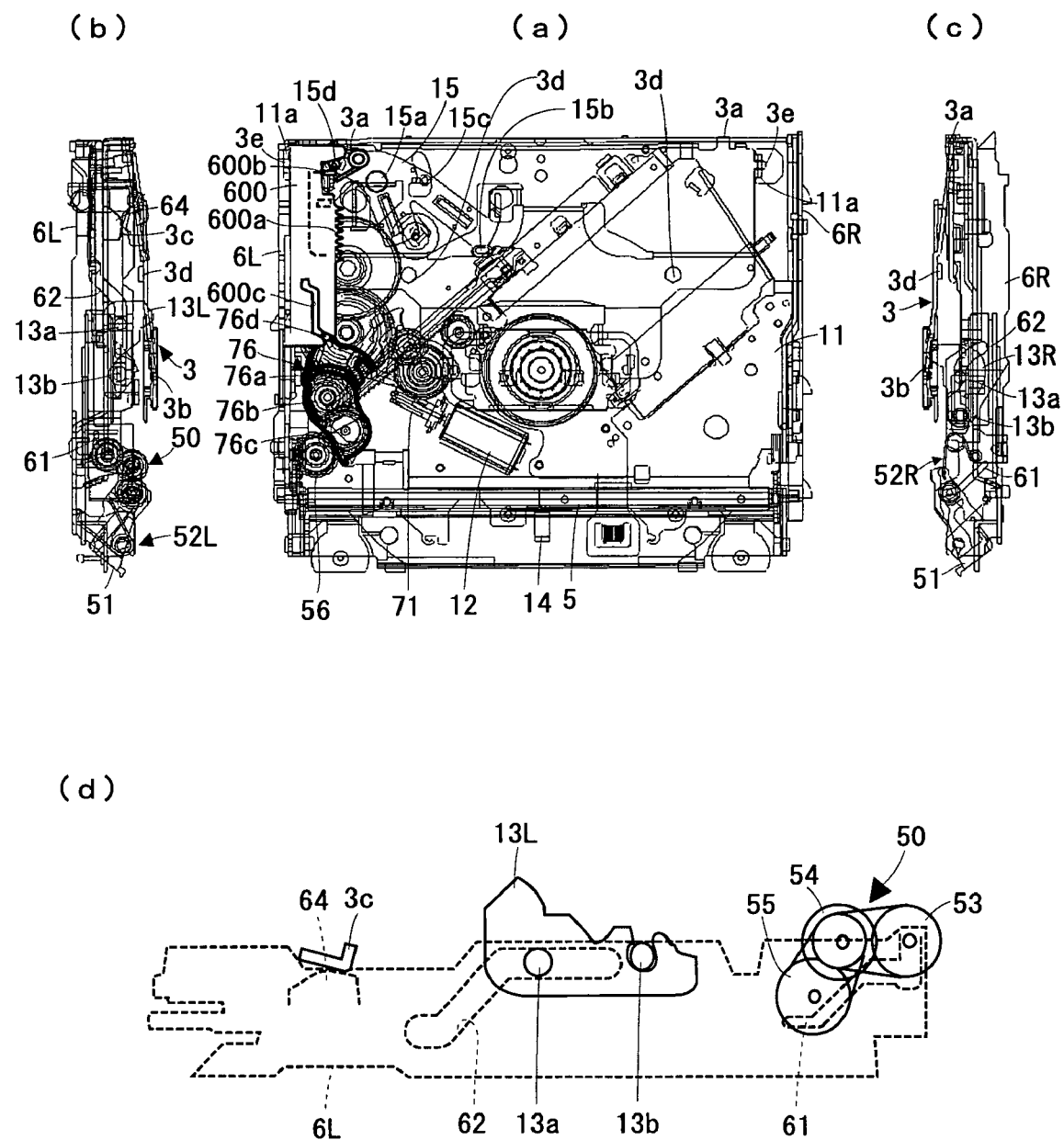
FIG. 3 is a view illustrating a disk player according to an embodiment of the present invention (a driving mechanism is illustrated)

A transfer roller 5 for loading or unloading a disk into the disk player main body 1 is provided in the vicinity of the disk loading slit 20 (see FIG. 3). In the playing state, the transfer roller 5 has completed a transfer of the disk and is separated from the disk by a retracting operation through a roller driving mechanism 50.

The roller driving mechanism 50 is configured to include a mounting plate 51, torsion springs 52R, 52L, a first roller-use gear 53, a second roller-use gear 54, and a third roller-use gear 55, and these gears are provided on a left side surface of the disk player main body 1. The third roller-use gear 55 is provided rotatably about a shaft secured to a left side surface of the main body chassis 11. A transfer gear 56 (see FIG. 3) transmits a driving power to the third roller-use gear 55.

The second roller-use gear 54 meshes with the third roller-use gear 55, and engages with a shaft of the third roller-use gear 55 with a link lever 57. The second roller-use gear 54 becomes capable of rotating, and the shaft thereof becomes capable of moving therewith. Further, the first roller-use gear 53 meshes with the second roller-use gear 54, and engages with a shaft of the second roller-use gear 54 with a link lever 58. The first roller-use gear 53 becomes capable of rotating, and the shaft thereof becomes capable of moving therewith.

A shaft of the first roller-use gear 53 is provided on the mounting plate 51. The mounting plate 51 is provided rotatably about a supporting shaft of the torsion spring 52L. Further, the aforementioned transfer roller 5 is coupled to the shaft of the first roller-use gear 53. Therefore, a rotation of the mounting plate 51 changes a position of the transfer roller 5, thereby providing a disk-transferring state and a state retracted from the disk.

Sliders 6L, 6R are provided on both side surfaces of the main body chassis 11. FIG. 3(*d*) illustrates the slider 6L in an enlarged form (it is noted that FIG. 3(*d*) illustrates the ejecting state). The slider 6L is formed of a main body portion placed on a side surface of the main body chassis 11 and a drive auxiliary portion 600 placed an upper surface of the main body chassis 11. A relation between the main body portion and the drive auxiliary portion 600 will be described in "General Outline of Driving Power Transfer of Motor 12".

Figure 2:
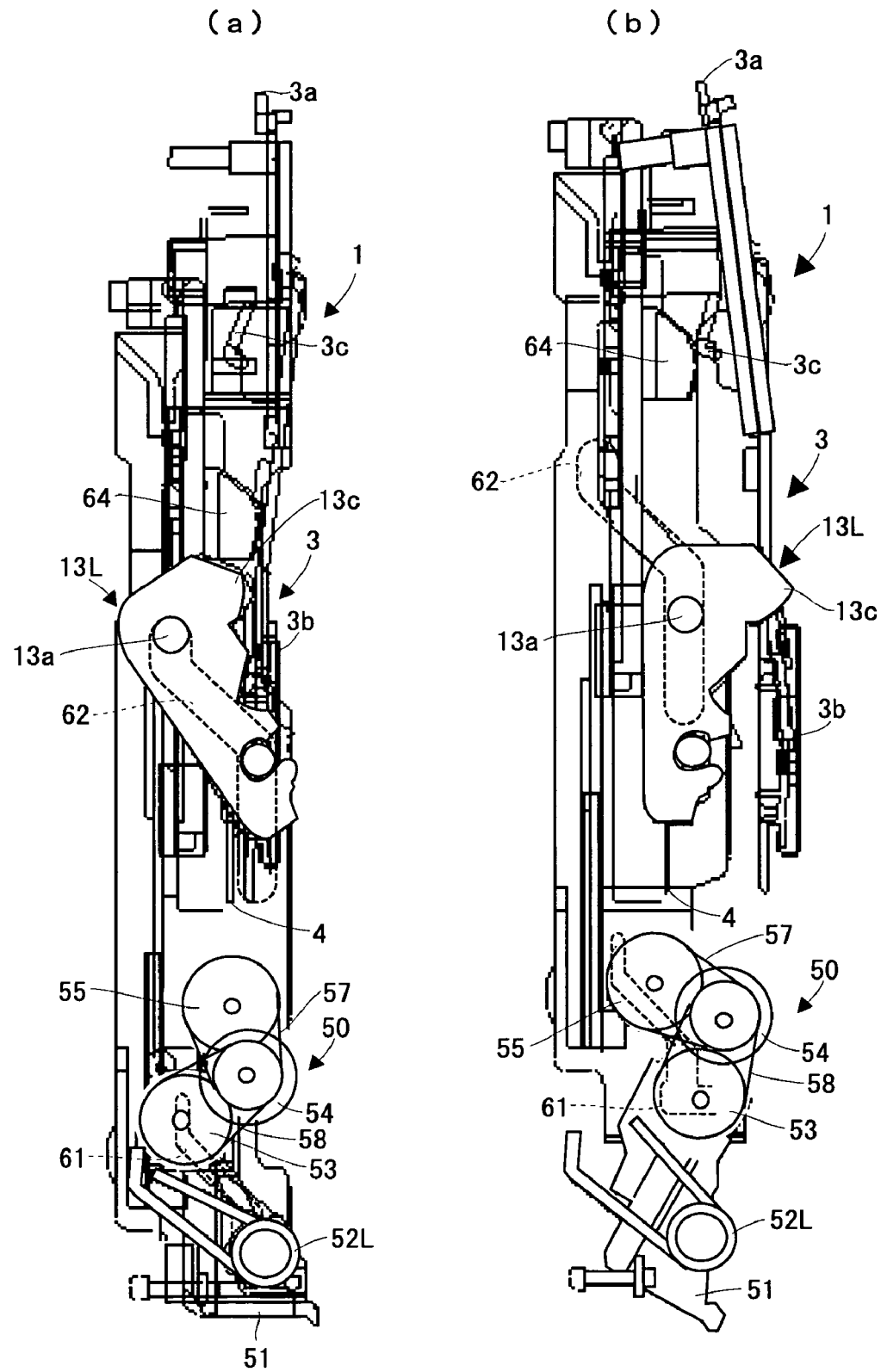
FIG. 2(a) is a side view illustrating a playing state.
FIG. 2(b) is a side view illustrating a transition state (state slightly before ejecting)

In the playing state, the sliders 6L, 6R are placed on the nearest side. Each of the sliders 6L, 6R is formed with an incline-shaped (step-shaped) first guide slot 61. The shaft of the first roller-use gear 53 engages with the first guide slot 61. In a state that the sliders 6L, 6R are placed on the nearest side, as illustrated in FIG. 2(*a*), the shaft of the first roller-use gear 53 is made to be engaged with a lower side (rear side) of the first guide slot 61 and the mounting plate 51 rotates against a bias of the torsion springs 52L, 52R, resulting in a state that the transfer roller 5 is descended, and retracted from the disk.

Each of the sliders 6L, 6R is formed with an incline-shaped (step-shaped) second guide slot 62. A guide protrusion 13*a* on each of lock levers 13L, 13R engages with the second guide slot 62. The lock levers 13L, 13R are provided rotatably about a shaft 13*b*. In a state that the sliders 6L, 6R are placed on the nearest side, the guide protrusion 13*a* is made to be engaged with a lower side (rear side) of the second guide slot 62 and an upper end portion 13*c* of each lock lever 13L, 13R separates from an engaging hole (not shown) in the upper surface of the chassis base 101. Therefore, in the playing state, an elastically-supported state of the main body chassis 11 by the above-described coil spring clampers 102 is provided.

A pushing protrusion 64 is formed on the slider 6L. In the playing state, the pushing protrusion 64 separates from an engaging piece 3*c* on the clamper 3, thereby causing the clamper 3 to descend.

(2) Transition State (Relating to Transfer of Disk)

FIG. 2(*b*) illustrates a state immediately before an end of transition (state slightly before completion of ejection). In this transition state, the sliders 6L, 6R are placed on a far side. In this FIG. 2(*b*), the shaft of the first roller-use gear 53 engages with a front portion on a near side of the first guide slot 61 and the mounting plate 51 rotates by receiving the bias by the torsion springs 52L, 52R, causing the transfer roller 5 to move upwardly. Further, in this state, the guide protrusion 13*a* engages with an upper-step portion of the second guide slot 62 and the upper end portion 13*c* of the lock lever 13L, 13R engages with the engaging hole in the upper surface of the chassis base 101, thereby releasing an elastic supporting state of the main body chassis 11 by the coil spring clampers 102 (the main body chassis 11 is placed and secured to the chassis base 101). Further, in this state, the pushing protrusion 64 contacts the engaging piece 3*c* on the clamper 3, causing the clamper 3 to lift.

(3) Ejecting State (Relating to Transfer of Disk)

In the ejecting state, the sliders 6L, 6R are placed on the farthest side. In this state, the shaft of the first roller-use gear 53 engages with the nearest side of the first guide slot 61 and thus the transfer roller 5 moves to the uppermost position, thereby resulting in a disk-transferable state. The near-side portion of the first guide slot 61 is made larger in some degree in a height direction, thereby allowing a movement of the shaft of the first roller-use gear 53 (movement of the transfer roller 5). That is, when a disk is inserted, the transfer roller 5 can be descended to some degree when pushed by the disk. Further, in this ejecting state, a placed-and-secured state of the main body chassis 11 is maintained and a state of lifting the clamper 3 is maintained.

(4) Ejecting State (Relating to Transfer of Driving Power of Motor 12)

Figure 4:
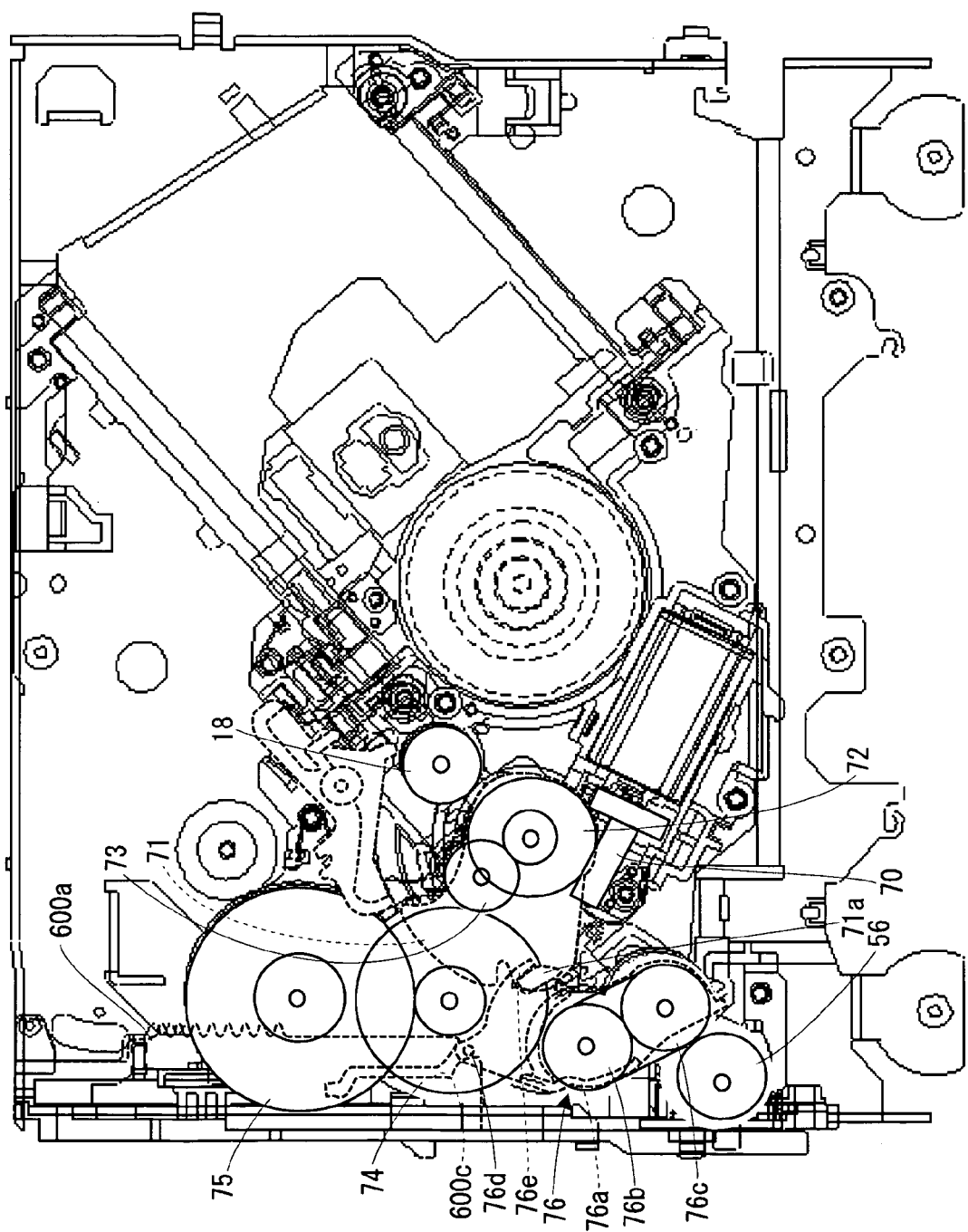
FIG. 4 is a plan view illustrating a disk player according to an embodiment of the present invention.

FIG. 3(*a*), 3(*b*), 3(*c*) and 3(*d*) and FIG. 4 illustrate the ejecting state. In this state, a disk can be loaded into the player main body 1. When a sensor 14 detects a disk having been inserted into the disk loading slit 20, an electric power is supplied to the motor 12, causing the motor 12 to rotate. The driving power is transmitted to a first gear 72 through a worm gear 70 provided on a shaft of the motor 12.

Figure 10:
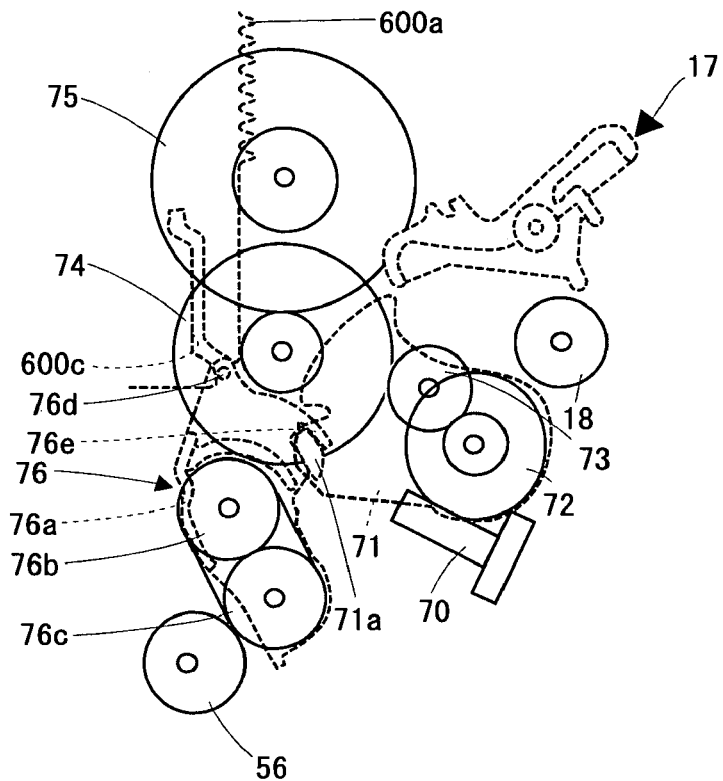
FIG. 10(a) is a descriptive diagram corresponding to FIG. 4.
FIG. 10(b) is a descriptive diagram corresponding to FIG. 7.
Figure 10:
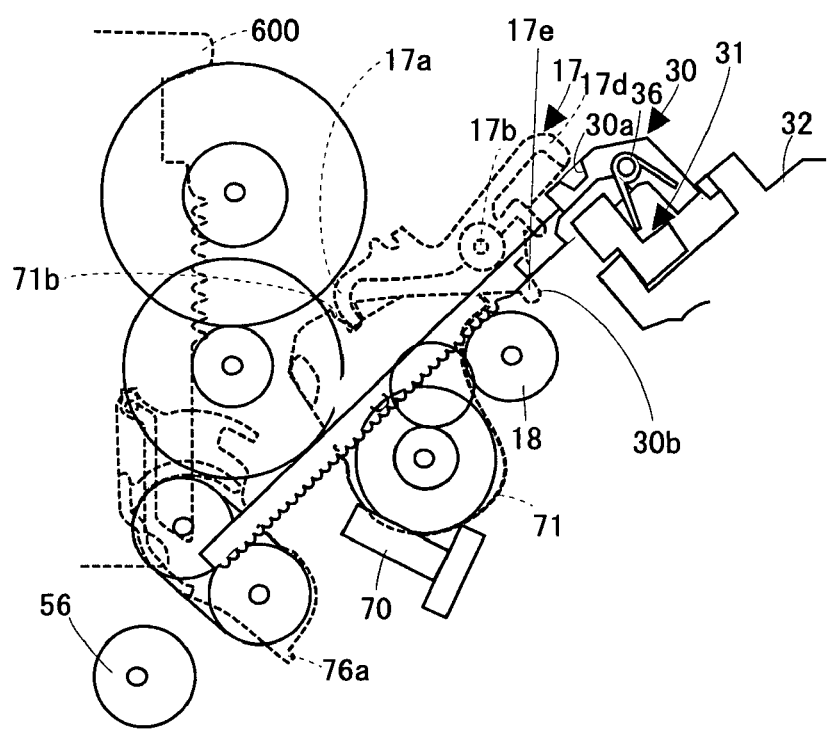

As illustrated in FIG. 10(*a*), too, a second gear 73 meshes with a small gear portion of the first gear 72. The second gear 73 is provided on a rotation plate 71. The rotation plate 71 rotates about a shaft of the first gear 72. The second gear 73 meshes with a large gear portion of a third gear 74. A small gear portion of the third gear 74 meshes with a large gear portion of a fourth gear 75. A small gear portion of the fourth gear 75 is provided such that it meshes with a rack portion 600*a* formed on a drive auxiliary portion 600. Further, the large gear portion of the third gear 74 meshes with a gear 76*b* in a roller gear separating mechanism 76. The gear 76*b* meshes with a gear 76*c*. The gear 76*c* is provided such that it meshes with a transfer gear 56. The gear 76*b* is provided on a movable plate 76*a*. The movable plate 76*a* rotates about a shaft of the gear 76*b*.

As illustrated in FIG. 3(*a*), a disk sensing lever 15 is provided on an upper-surface side of the disk player main body 1. The disk sensing lever 15 rotates about a shaft 15*a*. When a disk is further pushed therein, in the case of an 8-cm disk, the disk contacts a protrusion 15*b*, causing the disk sensing lever 15 to rotate in a counterclockwise direction, and in the case of a 12-cm disk, it contacts a protrusion 15*c*, causing the disk sensing lever 15 to rotate in the counterclockwise direction. This rotation causes a operation protrusion 15*d* to push an contact portion 600*b* on the drive auxiliary portion 600.

The drive auxiliary portion 600 is provided such that it can move by a predetermined distance in a sliding direction with respect to the slider 6L, against a spring not shown. Therefore, when the operation protrusion 15*d* pushes the contact portion 600*b* on the drive auxiliary portion 600, only the drive auxiliary portion 600 moves against the aforementioned spring with a small force, and the rack portion 600*a* meshes with the small gear portion of the fourth gear 75. When the drive auxiliary portion 600 is further moved by the driving power of the fourth gear 75, a part of the drive auxiliary portion 600 contacts a part of the slider 6L, which causes the slider 6L to slide.

A guide slot 600c is formed in the drive auxiliary portion 600. In the ejecting state, a first protrusion 76d formed on the movable plate 76a is placed at an inlet port of the guide slot 600c. Further, in this ejecting state, a second protrusion 76e formed on the movable plate 76a is engaged with a protrusion 71a formed on the rotation plate 71 (see FIG. 10(*a*)).

(5) Transition State (Relating to Transfer of Driving Power of Motor 12)

Figure 5:
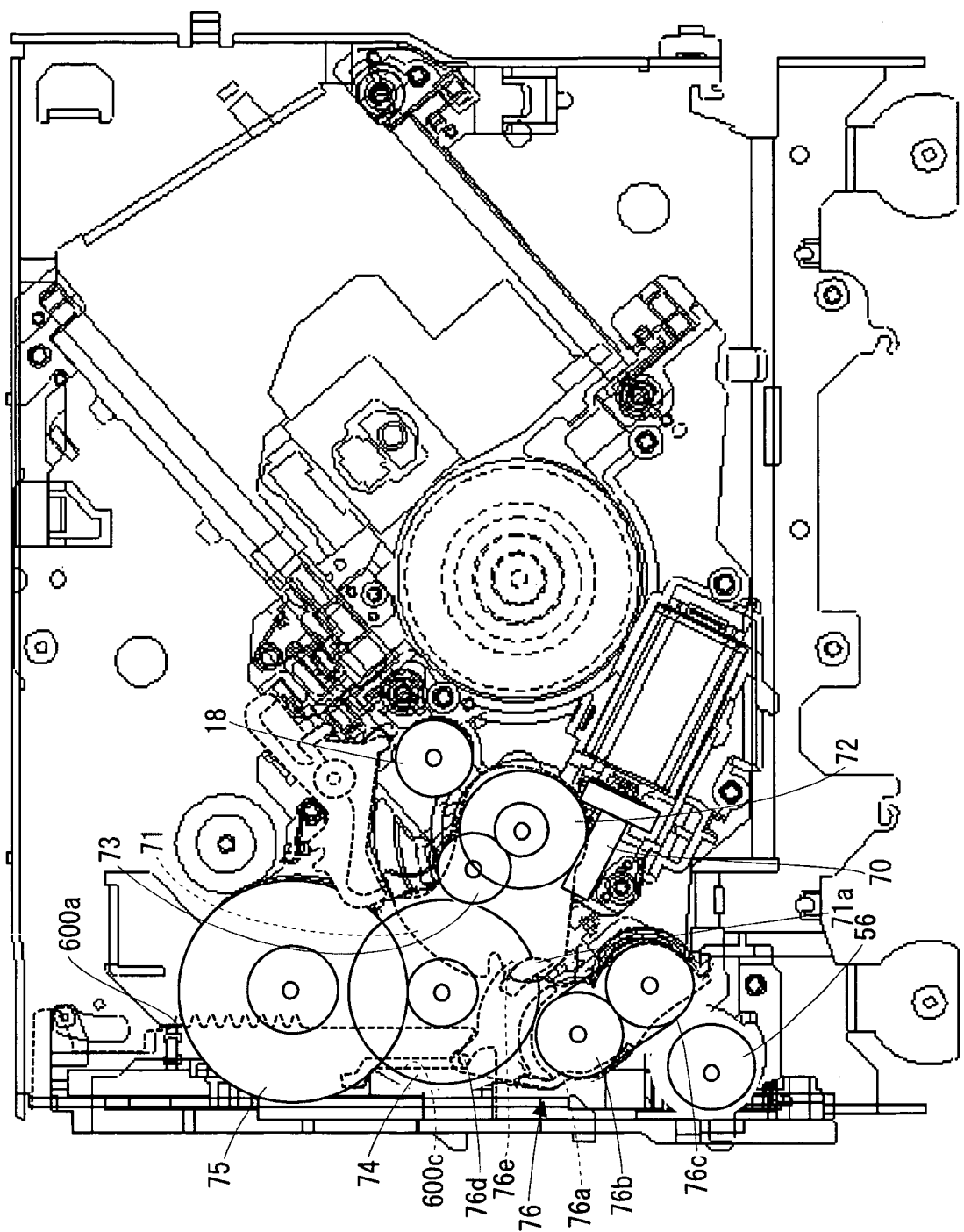
FIG. 5 is a plan view illustrating a disk player according to an embodiment of the present invention.
Figure 6:
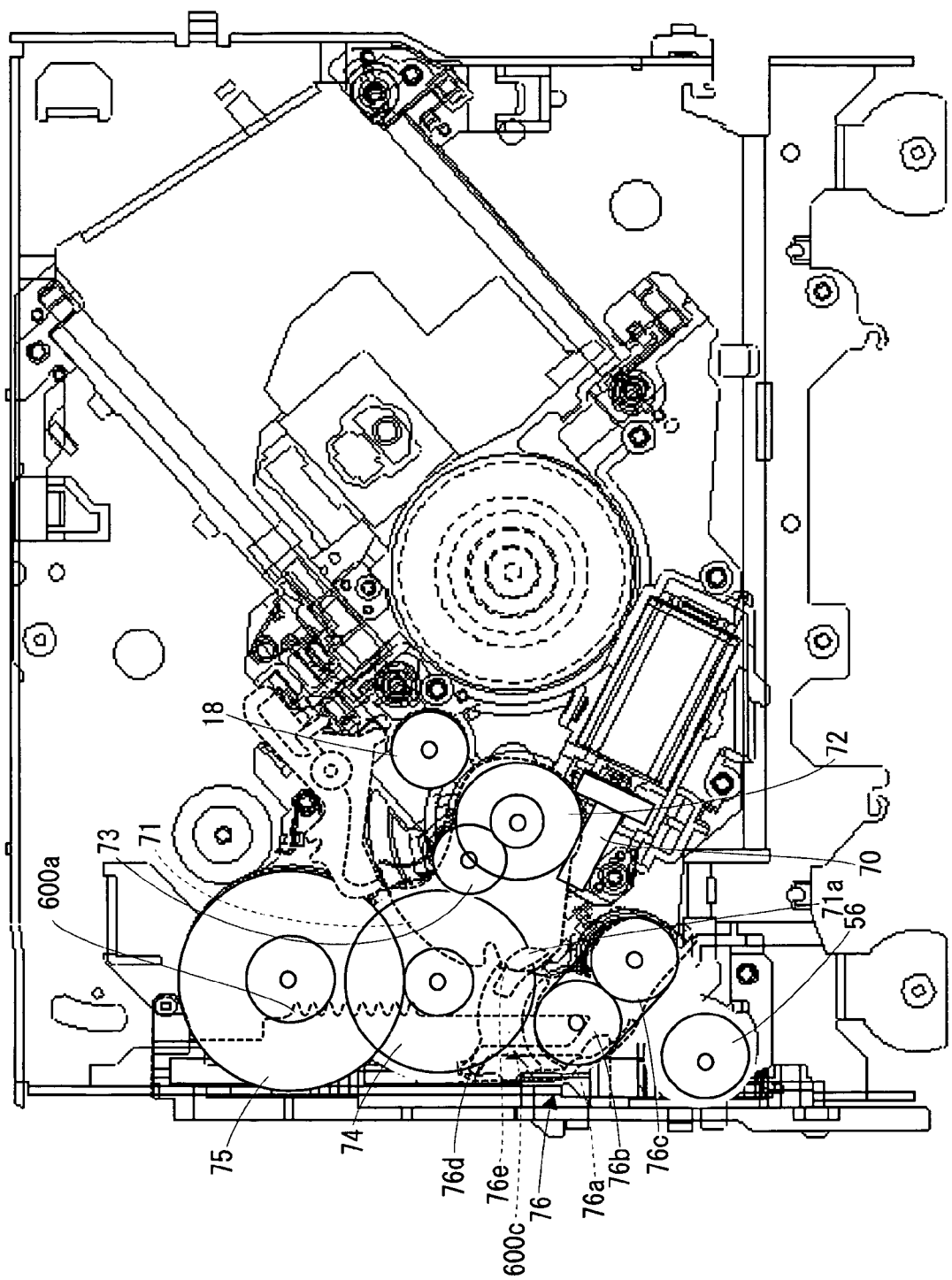
FIG. 6 is a plan view illustrating a disk player according to an embodiment of the present invention.

As a result of the drive auxiliary portion 600 moving, the first protrusion 76d is guided into the guide slot 600c as illustrated in FIGS. 5 and 6. This rotates the movable plate 76a in the counterclockwise direction, causing the gear 76c to be separated from the transfer gear 56 (separation of the roller gear). Further, as a result of the movable plate 76a rotating in the counterclockwise direction, an engagement state between the second protrusion 76e and the protrusion 71a is released.

(6) Playing State (Relating to Transfer of Driving Power of Motor 12)

Figure 7:
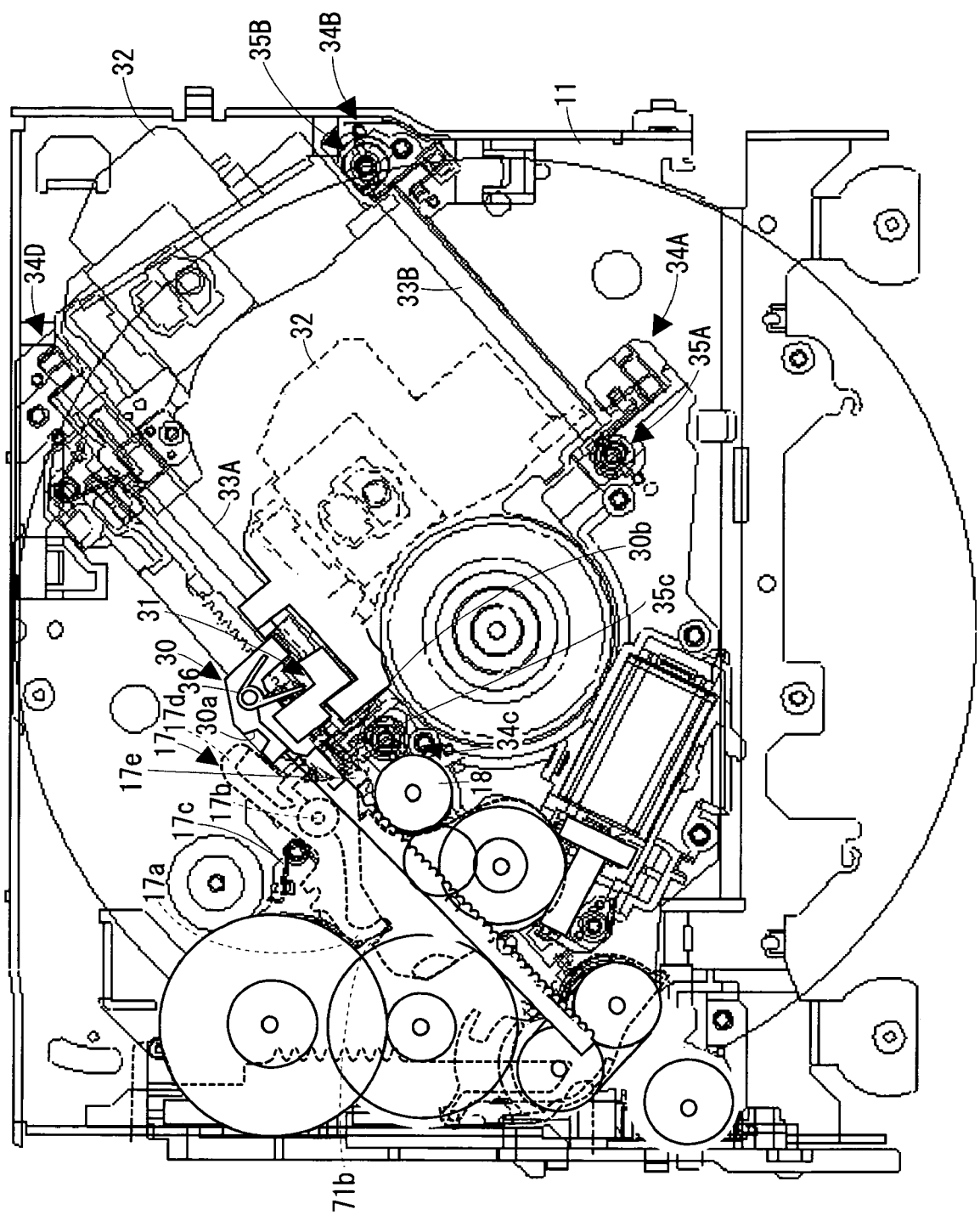
FIG. 7 is a plan view illustrating a disk player according to an embodiment of the present invention.

The rotation plate 71 released from the engagement state rotates by itself in the clockwise direction due to an inertia by the rotation of the gear 72, as illustrated in FIG. 7. Then, as a result of the gear 73 meshing with a dummy gear (by a single tooth of the gear), the rotation plate 71 further rotates, and the gear 73 meshes with a rack-driving gear 18.

A lock lever 17 is provided rotatably about a shaft 17b and is biased in the counterclockwise direction by a torsion spring 17c. A first lock protrusion 17a is provided at a left-side position on the lock lever 17 (the side which descends in the counterclockwise direction). This first lock protrusion 17a is in contact with the peripheral surface of the rotation plate 71 and since the rotation plate 71 has rotated in the clockwise direction, the lock protrusion 17a engages with a concave portion 71b formed on the aforementioned peripheral surface as illustrated in FIG. 10(*b*). Thus, in the playing state, a state that the driving power of the motor 12 is transmitted to the rack driving gear 18 is maintained. Further, a second lock protrusion 17d is provided at a right-side position (the side which rises in the counterclockwise direction) on the lock lever 17. This second lock protrusion 17d separates from a concave portion 30a on a rack mechanism 30. This allows the rack mechanism 30 to operate in the playing state.

The rack mechanism 30 is coupled to an optical pickup base 32 via a universal joint 31. As illustrated in FIG. 7, the optical pickup base 32 slides by being guided by two shafts 33A, 33B. The two shafts 33A, 33B are supported on the main body chassis 11 via mounting bases 34A, 34B, 34C, and 34D. Further, one end of the shaft 33A (near the center of the main body chassis) is coupled to a height adjusting mechanism 35C and the both ends of the shaft 33B are coupled to height adjusting mechanisms 35A, 35B. By adjusting the height adjusting mechanisms 35A, 35B, and 35C, an attitude of the optical pickup base 32 can be adjusted. Since the optical pickup base 32 and the rack mechanism 30 are coupled to each other via the universal joint 31, the attitude of the rack mechanism 30 will not be changed even when the attitude of the optical pickup base 32 changes.

Figure 8:
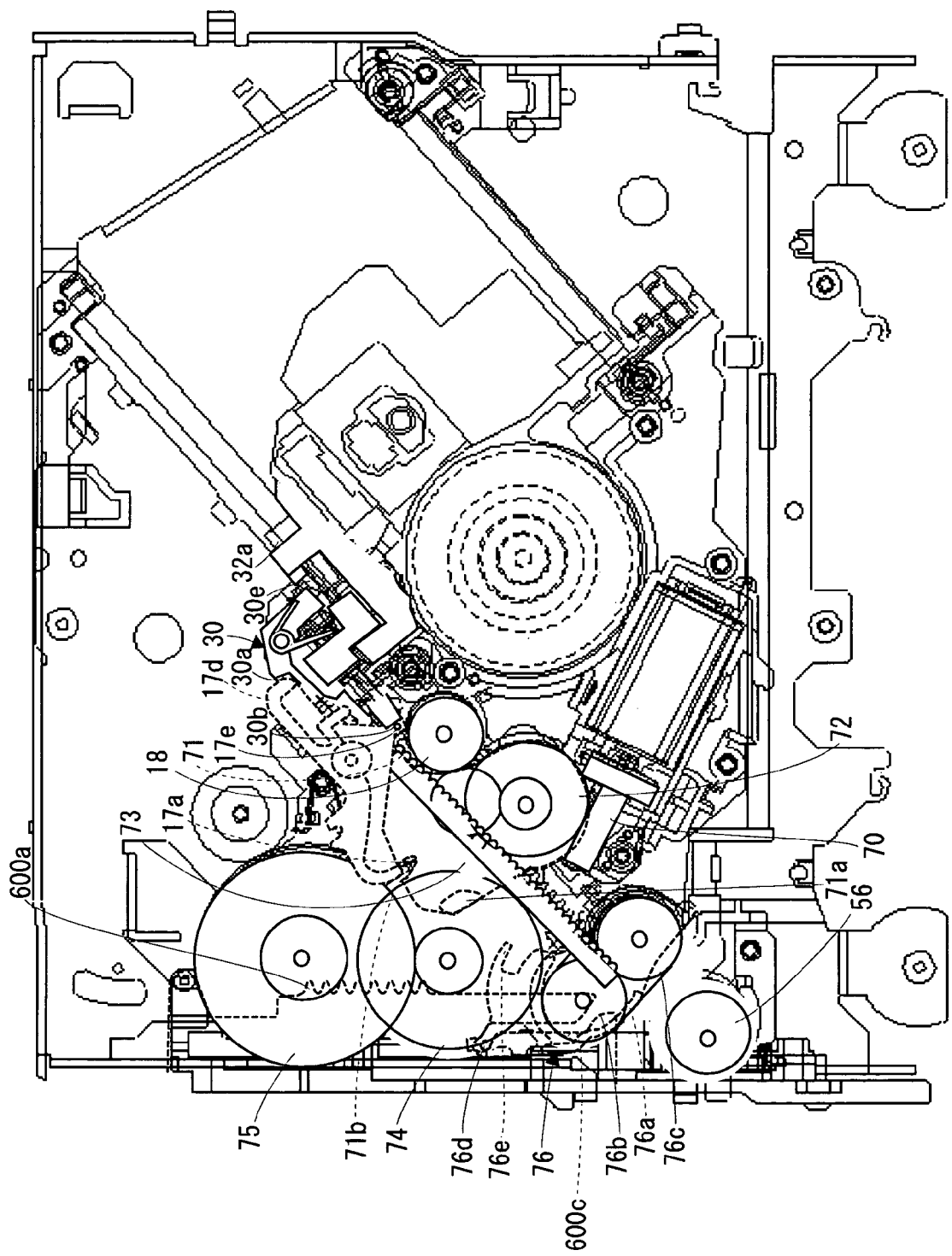
FIG. 8 is a plan view illustrating a disk player according to an embodiment of the present invention.

When a transition from the aforementioned playing state to the ejecting state is made, the gear 72 rotates in the counterclockwise direction thus causing the rack driving gear 18, too, to rotate in the counterclockwise direction, and the rack mechanism 30 causes the optical pickup base 32 to move to a center position. This, as illustrated in FIG. 8, allows a contact portion 30b on the rack mechanism 30 to depress a concave portion 17e on the lock lever 17. Therefore, the lock lever 17 rotates in the clockwise direction and the second lock protrusion 17d engages with the depression 30a in the rack mechanism 30. This, when the transition to the ejecting state is made, brings the rack mechanism 30 in a fixed state. Further, since the lock lever 17 rotates in the clockwise direction, the first lock protrusion 17a separates from the concave portion 71b. Since the gear 72 is being rotated in the counterclockwise direction, the rotation plate 71 rotates in the counterclockwise direction due to the inertia of the rotation of the gear 72, and the gear 73 meshes with the third gear 74 (see FIG. 4).

(Detailed Description of Main Parts)

(7) Relating to Insertion of Disk

Figure 9:
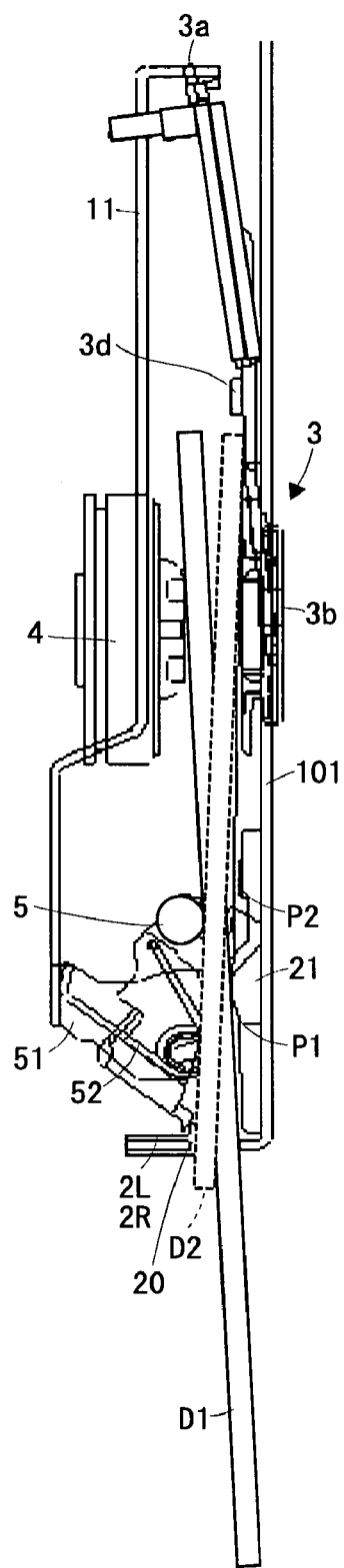
FIG. 9 is a descriptive diagram illustrating a state where a disk is being inserted.
Figure 9:
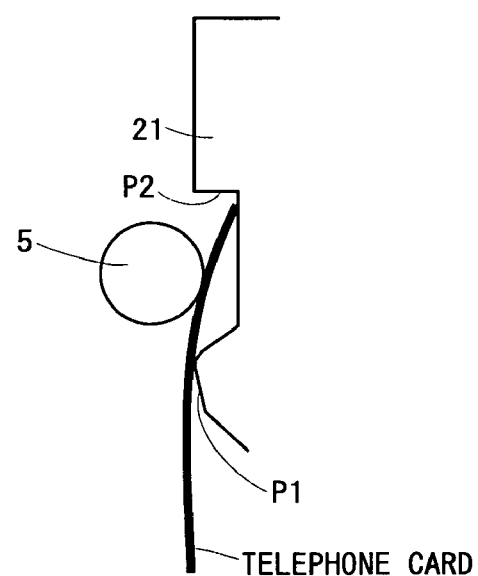

As illustrated in FIG. 1(*a*), the disk loading slit 20 is provided with the right disk guide 2R and the left disk guide 2L, and has a shape similar to a T-shape. When a 12-cm disk D1 is inserted, as illustrated in FIG. 9, this disk D1 is guided onto the upper surfaces of the disk guides 2R, 2L and transferred into the player main body 1 while being maintained substantially in a horizontal attitude. It is noted that the transfer roller 15 descends to some degree by being pushed by the 12-cm disk D1 (this is the same in a case of an 8-cm disk D2), and transfers the disk D1 while keeping in contact with the disk D1. On the other hand, the 8-cm disk D2 can be placed on the upper surfaces of the disk guides 2R, 2L in a portion in the vicinity of the diameter of the disk, and when the portion in the vicinity of the diameter of the disk enters the player main body, the 8-cm disk D2 is not supported by the disk guides 2R, 2L, allowing the rear end thereof to descend, and thus the tip end thereof becomes oriented upwardly.

On a lower surface of the upper plate of the chassis base 101, protrusions 101b, 101b are formed (see FIG. 1(*a*)). Further, on a lower surface of the clamper 3, protrusions 3d, 3d are formed as illustrated in FIG. 9(*a*). A tip end side of the 8-cm disk D2 proceeding while being oriented upwardly contacts the protrusions 3d, 3d (or the protrusions 101b, 101b) and the disk D2 stops in a state that the center portion thereof is placed on the disk receiving portion 4. It is noted that any one of the protrusions 101b, 101b or the protrusions 3d, 3d may be formed.

A restriction plate 21 is provided on a lower surface of a near side of the upper plate of the chassis base 101. The disk D1 and the disk D2 are both inserted while keeping in contact with a contact guide portion P1 of the restriction plate 21. Further, a stopper portion P2 is formed on a farther-side portion than the contact guide portion P1 and a portion between the contact guide portion P1 and the stopper portion P2 has a concave shape. The transfer roller 5 is placed in this concave-shaped portion. A peripheral surface of the transfer roller 5 is placed in a moving direction of the disks D1, D2 proceeding while contacting the upper surfaces of the disk guides 2R, 2L of the disk loading slit 20 and the contact guide portion P1. The stopper portion P2 exists at a position corresponding to a direction of a tangent line which passes through the contact guide portion P1, out of the tangent lines of the peripheral surface, at positions other than the moving direction of the disks D1, D2.

At an initial stage of an insertion of the disks D1, D2, the disks D1, D2 proceed while keeping in contact with the contact guide portion P1 and the upper surfaces of the disk guides 2R, 2L and, in middle of the insertion, the disks D1, D2 contact the peripheral surface of the transfer roller 5, causing the transfer roller 5 to descend downwardly while being transferred by the transfer roller 5. Since the stopper portion P2 does not exist in the moving direction of the disks D1, D2, the transfer of the disks D1, D2 will not be obstructed. It is noted that after the disk D2 passes at a position in the vicinity of the stopper portion P2, the rear end of the disk D2 is allowed to descend, and therefore the disk D2 proceeds while being oriented upwardly.

Even if an attempt is made to insert a telephone card, etc., into the disk loading slit 20 out of mischief, this card can be prevented from being inserted into the plate main body 1. Telephone cards, etc., are formed to be relatively thin and thus are soft and easily bent compared with disks. Therefore, an inserted telephone card can not push down the transfer roller 15. Since the transfer roller 15 is not pushed down, the card will proceed toward the stopper portion P2 and contact the stopper portion P2, which stops the transfer.

As described above, the present invention is effective in that the stopper portion does not exist in the moving direction of the disk being inserted, and therefore, the transfer of the disk will not be obstructed and. On the other hand, if an attempt is made to insert a telephone card, etc., into the disk loading port out of mischief, this card can not push down the disk transfer roller downwardly, and therefore, the card will contact the stopper portion, thereby stopping the transfer.

(8) Relating to Clamper

Figure 11:
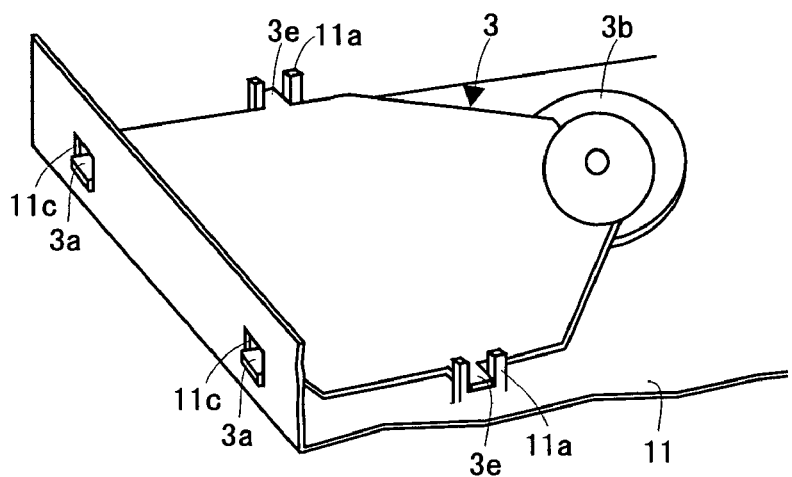
FIG. 11 is a schematic perspective view illustrating a clamper, etc.
Figure 12:
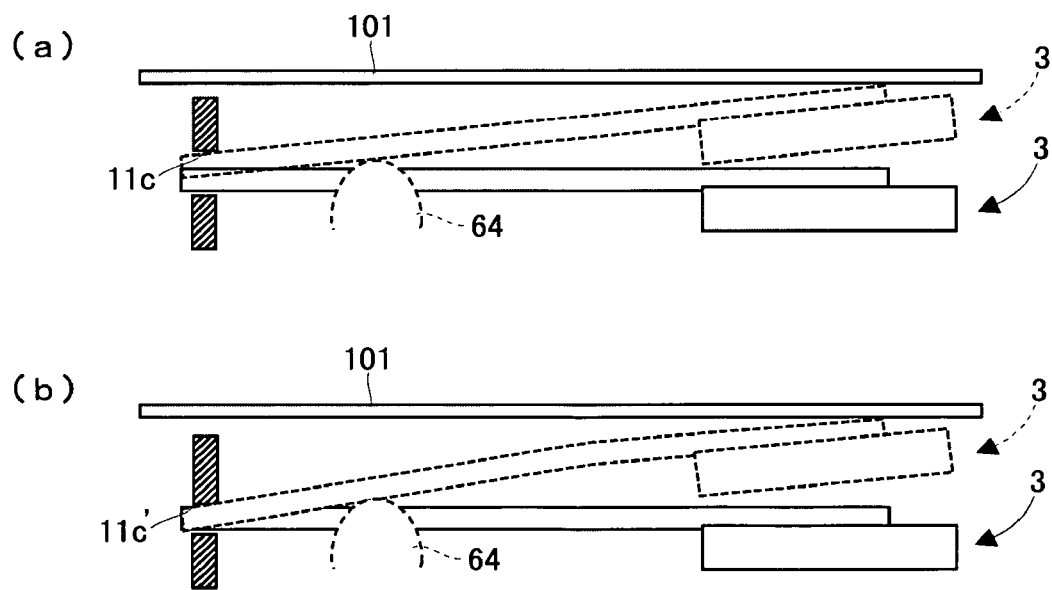
FIG. 12 is a descriptive diagram illustrating a rotating operation of a clamper.

FIG. 11 is a perspective view simply illustrating a supporting mechanism for the clamper 3. Rectangular holes 11c, 11c are formed in a rear-wall portion of the main body chassis 1, and the supporting point portions 3a, 3a of the clamper 3 engage with these rectangular holes 11c, 11c. The supporting point portions 3a, 3a are allowed to move upwardly and downwardly while rightward and leftward movements are restricted in the rectangular holes 11c, 11c. Further, at right-hand and left-hand positions on a far side in the main body chassis 11, erected portions 11a, 11a are formed. At an upper end portion of each erected portion 11a, a vertical cutout is formed and each of the side convex portions 3e, 3e of the clamper 3 engages with the vertical cutout. The side convex portions 3e, 3e are allowed to move upwardly and downwardly while restricted to move frontwardly and rearwardly in the vertical cutouts.

As described above, in the ejecting state, the slider 6L is placed on the farthest side. In this state, the pushing protrusion 64 abuts against the engage piece 3c of the clamper 3, causing the clamper 3 to lift. At this time, a tip end (near the flange portion 3b) of the clamper 3 is pushed against an upper plate of the chassis base 101 to be positioned and when this pushing force is large, the clamper 3 may be caused to be bent. Further, if a lifting operation of the clamper 3 is repeatedly performed many times, fatigue may occur to a metal constituting the clamper 3.

As illustrated in a view in FIG. 12(b) for comparison and reference, when a height of a rectangular hole 11c' is equivalent to a thickness of the supporting point portion 3a, the uppermost position of the clamper 3 at a time of being lifted is determined by a positional relation between the supporting point portion 3a of the clamper 3 and the pushing protrusion 64. When there is an error in the positional relation between the aforementioned uppermost position and the chassis base 101, the clamper 3 may be caused to be bent as described above. In this embodiment, the height of the rectangular hole 11c is made higher than the thickness of the supporting point portion 3a, thus allowing the supporting points 3a, 3a to move upwardly and downwardly in the rectangular hole 11c. Therefore, when the clamper 3 is lifted to abut against the upper plate of the chassis base 101, the supporting point portions 3a, 3a are allowed to float in the rectangular holes 11c, as illustrated in FIG. 12(a). As a result of such floating being allowed, the pushing force at a time that the tip end of the clamper 3 abuts against the upper plate of the chassis base 101 becomes small, thereby preventing the clamper 3 from being bent. That is, the tip-end side of the clamper 3 is abutted against the upper plate of the chassis base 101 to achieve a positioning while the clamper 3 is prevented from being bent by the abutment.

(9) Relating to Drive of Optical Pickup Base

Figure 13:
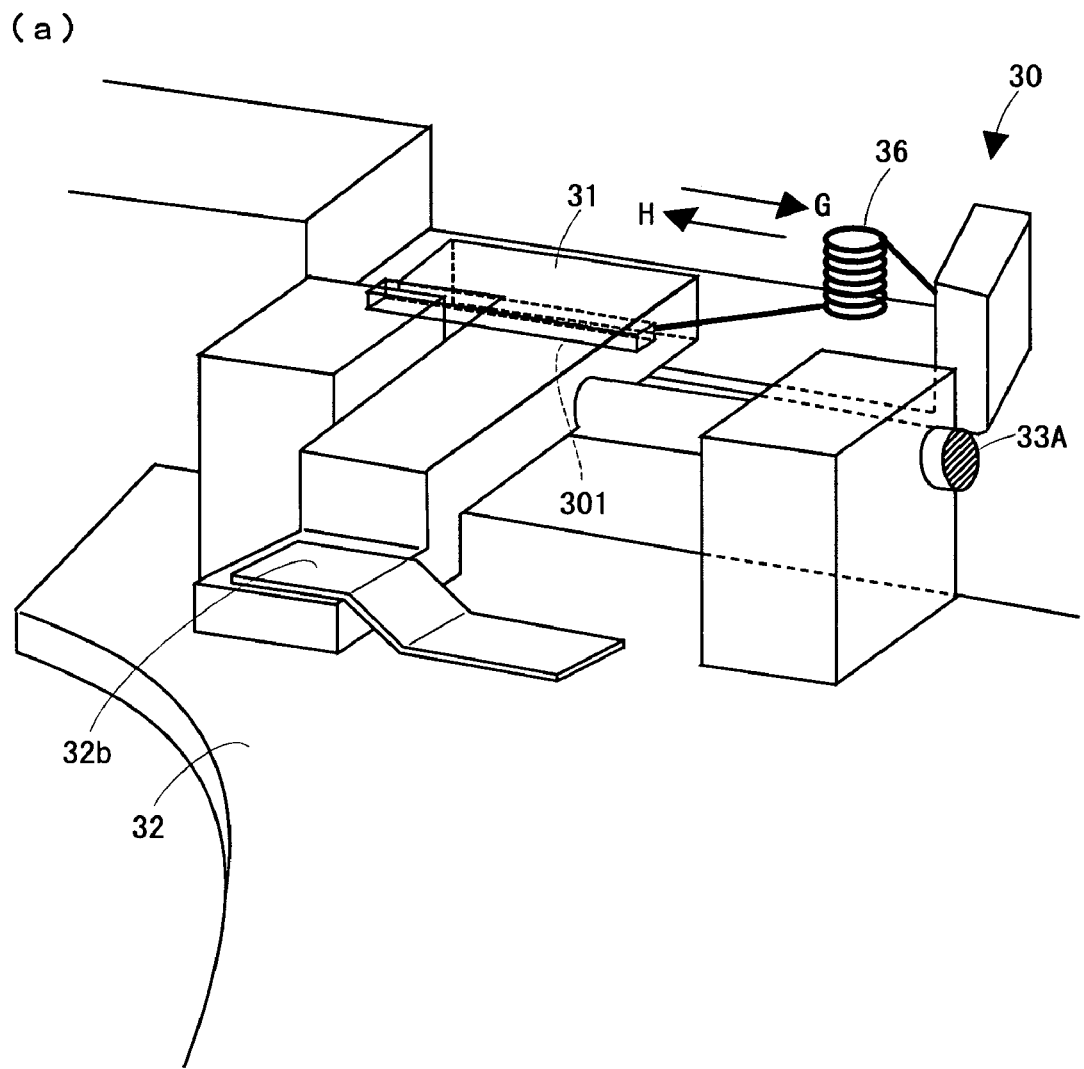
FIG. 13(a) is a perspective view simply illustrating a coupling portion of an optical pickup base, and as illustrated in the FIG. 13(b), is a partial cross sectional view illustrating an engagement between a universal joint and a convex rail on the rack mechanism.
Figure 13:
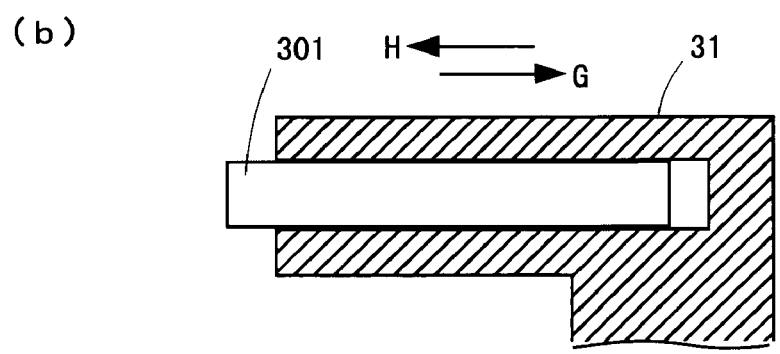

FIG. 13 is a perspective view simply illustrating the coupling portion of the optical pickup base. As described above, the rack mechanism 30 is coupled to the optical pickup base 32 via the universal joint 31. The universal joint 31 is provided in such a manner as to extend across the rack mechanism 30 to the optical pickup base 32. As illustrated in FIG. 13(b), the universal joint 31 is provided in such a manner as to engage with a convex rail 301 of the rack mechanism 30 on one end (on the rack mechanism 30 side), and as to be slidable in a G direction and an H direction. The other end of the universal joint 31 (on the optical pickup base 32 side) is depressed (biased downwardly) against the optical pickup base 32 by a flat spring 32b and, when the universal joint 31 is moved, the optical pickup base 32 moves. The flat spring 32b is secured to the optical pickup base 32 by a screw, etc. With this configuration, even when an attitude of the optical pickup base 32 is adjusted, a change of a position will be absorbed by the universal joint 31 and the attitude of the rack mechanism 30 will not be changed.

A torsion spring 36 contacts, at its one end, a side surface of the universal joint 31 which faces in the G direction and contacts, at the other end, a side surface of the rack mechanism 30 which faces in the H direction. When the rack mechanism 30 moves in the G direction, the universal joint 31 is brought into contact with an end portion of the convex rail 301 and is moved by being pushed by the rack mechanism 30. Further, when the rack mechanism 30 moves in the H direction, a force of a movement of the rack mechanism 30 is applied to the universal joint 31 via the torsion spring 36. The torsion spring 36 has a sufficiently large elasticity and can transmit the movement of the rack mechanism 30 to the universal joint 31 without being largely bent.

FIG. 13 illustrates the rack mechanism 30 moves most largely in the H direction (that is, the ejecting state). In this state, as illustrated in FIG. 8, the contact portion 30b on the rack mechanism 30 pushes the convex portion 17e of the lock lever 17 (a trigger operation for the transition to the ejecting state), and thus the lock lever 17 rotates in the clockwise direction, causing the second lock protrusion 17d to engage with the concave portion 30a in the rack mechanism 30, which brings the rack mechanism 30 into the locked state. That is, even when the optical pickup base 32 is placed at a guide end near a center of the player main body 1, the rack mechanism 30 slightly moves in the H direction, causing the trigger operation to be carried out so as to transfer to the ejecting state (in this state, the torsion spring 36 is further contracted). Therefore, a lock operation of the rack mechanism 30 is performed after the optical pickup base 32 surely moves to the center of the player main body 1 (after the optical pickup is placed at the information recording area on the disk innermost area), which can surely prevent a situation where the optical pickup can not reach the information recording area on the disk innermost area.

Further, the lock lever 17 is provided such that when the optical pickup base 32 moves to the disk center, the operation for fixing the rack mechanism 30 by the trigger operation using this movement and the operation for switching the supplying destination of the driving power from the rack mechanism 30 to the disk-transfer mechanism are concurrently performed. Therefore, after the disk is clamped, the state that the optical pickup is fixed can be released with the same timing as switching of the supplying destination of the driving power transfer for moving the optical pickup.

Further, since the step-shaped slots 61, 62 are provided in the sliders 6L, 6R and the transfer roller 5 is moved along the slot 61 to be retracted from the disk through movement of the sliders 6L, 6R and the lock levers 13L, 13R are rotated along the slot 62, the transfer roller 5 can be retracted and the main body chassis 11 can be elastically supported with a simple configuration.

The invention claimed is:

1. A disk player, comprising:
a contact guide portion which comes into contact with a disk inserted from a disk loading port;
a stopper portion which is placed on a farther side than said contact guide portion;
a transfer roller that is provided between said contact guide portion and said stopper portion, and transfers the disk;
a transfer mechanism for transmitting a driving power of a motor to said transfer roller;
a clamper for clamping said disk transferred thereto;
a clamp mechanism for causing the clamper to lift or descend;
an optical pickup base which is guided in a linear manner in a radial direction of the disk clamped by said clamper;
and a pickup moving mechanism for moving said pickup base in the radial direction of said disk, wherein
a peripheral surface of said transfer roller is placed in a moving direction of the disk proceeding while keeping in contact with said disk loading port and said contact guide portion, said transfer roller is provided in such a manner as to move a little by being pushed by the disk, said disk proceeds without contacting said stopper portion, and on the other hand, a member to be bent easier than said disk is not capable of moving said transfer roller, said member proceeds toward said stopper portion and contacts the stopper portion, thus transferring is prevented.

2. A disk player according to claim 1, configured to be adaptable to both a first disk having a large diameter and a second disk having a small diameter, wherein said disk loading port includes disk transfer receiving portions on both sides, the second disk is configured in such a manner as to lose contact with said disk transfer receiving portions at an earlier stage of insertion than the first disk, and a transfer stopper for the second disk is provided at a position which comes into contact with only the second disk.

3. A disk player according to claim 1, configured to be adaptable to both a first disk having a large diameter and a second disk having a small diameter and comprising a moving member having a first contact portion which contacts a tip end of the first disk having a larger diameter transferred thereto by the transfer roller and a second contact portion which contacts a tip end of the first disk having a small diameter transferred thereto by the transfer roller, wherein the movement of the moving member as a result of the disk contacting said contact portion causes a switching of a supplying destination of the driving power of the motor from the transfer mechanism to the clamp mechanism.

4. A disk player according to claim 1, configured such that a reproducing portion is formed by being provided with said clamper, said clamp mechanism, said transfer mechanism, said optical pickup base, said pickup moving mechanism, and a roller supporting mechanism for movably supporting said transfer roller in the same cabinet, and configured to be adaptable to both a first disk having a large diameter and a second disk having a small diameter, comprising a lock mechanism for fixedly or elastically supporting said reproducing portion, a slider which engages with said lock mechanism and said roller supporting mechanism, and a moving member including a first contact portion which contacts a tip end of the first disk having a larger diameter transferred thereto by said transfer roller and a second contact portion which contacts a tip end of the first disk having a small diameter transferred thereto by said transfer roller, and configured such that a movement of said moving member caused as a result of the disk contacting said contact portion causes said slider to move, and this movement of said slider causes said roller supporting mechanism to move, thereby pulling said transfer roller away from the disk, and causes a lock mechanism to move, thereby changing said reproducing portion from a fixed state to an elastically-supported state.

5. A disk player according to claim 1, comprising a switching mechanism for switching of the supplying destination of the driving power of said motor either to said clamp mechanism or to said pickup moving mechanism, wherein said switching mechanism is configured in such a manner as to restrict a movement of said pickup moving mechanism when applying the driving power of said motor to said clamp mechanism, and allow the movement of the pickup moving mechanism when applying the driving power of the motor to the pickup moving mechanism.

6. A disk player according to claim 1, wherein the clamper is provided in such a manner as to be lifted or descended by said clamp mechanism with a rear-end portion thereof serving as a supporting point, and said rear-end portion is configured in such a manner as to engage with engaging holes which allow upward and downward movements of said rear-end portion.

7. A disk player according to claim 1, comprising a coupling mechanism for coupling said pickup base and said pickup moving mechanism, wherein said coupling mechanism is configured in such a manner as to allow a movement of said pickup moving mechanism even after said pickup base has been guided to a guide end near a center of the disk, and in such a manner that this movement causes a switching of the supplying destination of the driving power of said motor from said pickup moving mechanism to said clamp mechanism.

8. A disk player according to claim 7, wherein there is provided an adjusting mechanism for adjusting an attitude of said optical pickup base and said coupling mechanism is configured in such a manner as to allow a change of the attitude of the optical pickup base without changing the attitude of said pickup moving mechanism.

9. A disk player according to claim 7, configured in such a manner as to fix said pickup moving mechanism when the supplying destination of the driving power of said motor is switched from said pickup moving mechanism to said clamp mechanism.

10. A disk player, comprising:
a disk loading port;
a transfer roller that transfers a disk;
a roller supporting mechanism for movably supporting said transfer roller;
a transfer mechanism for transmitting a driving power of a motor to said transfer roller;
a clamper for clamping said disk transferred thereto;
a clamp mechanism for causing the clamper to lift or descend;
an optical pickup base which is guided in a linear manner in a radial direction of said disk clamped by said clamper;
a pickup moving mechanism for moving said pickup base in the radial direction of said disk;
and a coupling mechanism for coupling said pickup base and said pickup moving mechanism, wherein
said coupling mechanism is configured in such a manner as to allow a movement of said pickup moving mechanism even after said pickup base has been guided to a guide end near a center of the disk, and in such a manner that this movement causes a switching of the supplying destination of the driving power of said motor from the pickup moving mechanism to said clamp mechanism.

11. A disk player according to claim 10, configured in such a manner as to be adaptable to both a first disk having a large diameter and a second disk having a small diameter, wherein said disk loading port includes disk transfer receiving portions on both sides, the second disk is configured in such a manner as to lose contact with said disk transfer receiving portions at an earlier stage of insertion than the first disk, and a transfer stopper for the second disk is provided at a position which comes into contact with only said second disk.

12. A disk player according to claim 10, configured in such a manner as to be adaptable to both a first disk having a large diameter and a second disk having a small diameter and comprising a moving member having a first contact portion which contacts a tip end of the first disk having a larger diameter transferred thereto by said transfer roller and a second contact portion which contacts a tip end of the first disk having a small diameter transferred thereto by said transfer roller, wherein a movement of said moving member as a result of the disk contacting said contact portion causes a switching of the supplying destination of the driving power of said motor from said transfer mechanism to said clamp mechanism.

13. A disk player according to claim 10, configured such that a reproducing portion is formed by being provided with said clamper, said clamp mechanism, said transfer mechanism, said optical pickup base, said pickup moving mechanism, and said roller supporting mechanism in the same cabinet, and configured to be adaptable to both a first disk having a large diameter and a second disk having a small diameter,
comprising a lock mechanism for fixedly or elastically supporting the reproducing portion, a slider which engages with said lock mechanism and said roller supporting mechanism, and a moving member including a first contact portion which contacts a tip end of the first disk having a larger diameter transferred thereto by said transfer roller and a second contact portion which contacts a tip end of the first disk having a small diameter transferred thereto by said transfer roller, and
configured such that a movement of said moving member caused as a result of the disk contacting said contact portion causes said slider to move, and this movement of said slider causes said roller supporting mechanism to move, thereby pulling said transfer roller away from the disk, and causes a lock mechanism to move, thereby changing said reproducing portion from a fixed state to an elastically-supported state.

14. A disk player according to claim 10, comprising a switching mechanism for switching the supplying destination of the driving power of the motor either to said clamp mechanism or to said pickup moving mechanism, wherein said switching mechanism is configured in such a manner as to restrict a movement of said pickup moving mechanism when applying the driving power of said motor to said clamp mechanism and allow the movement of said pickup moving mechanism when applying the driving power of said motor to said pickup moving mechanism.

15. A disk player according to claim 10, wherein said clamper is provided in such a manner as to be lifted or descended by said clamp mechanism with a rear-end portion thereof serving as a supporting point, and said rear-end portion is configured in such a manner as to engage with engaging holes which allow upward and downward movements of said rear-end portion.

16. A disk player according to claim 10, wherein there is provided an adjusting mechanism for adjusting an attitude of said optical pickup base and said coupling mechanism is configured in such a manner as to allow a change of the attitude of the optical pickup base without changing the attitude of said pickup moving mechanism.

17. A disk player according to claim 10, configured in such a manner as to fix said pickup moving mechanism when the supplying destination of the driving power of said motor is switched from said pickup moving mechanism to said clamp mechanism.

* * * * *